United States Patent [19]
Fischer

[11] 3,869,826
[45] Mar. 11, 1975

[54] CULTIVATION OF PLANTS IN GREENHOUSES

[75] Inventor: Adolf Fischer, Mutterstadt, Germany

[73] Assignee: Badische Anilin- & Soda-Fabrik Aktiengesellschaft, Ludwigshafen/Rhein, Germany

[22] Filed: June 18, 1973

[21] Appl. No.: 371,140

Related U.S. Application Data

[63] Continuation of Ser. No. 178,124, Sept. 7, 1971, abandoned.

[30] Foreign Application Priority Data

Sept. 10, 1970 Germany............................ 2044821

[52] U.S. Cl.............................. 47/17, 47/39, 47/18
[51] Int. Cl............................ A01g 9/02, A01g 9/14
[58] Field of Search.......... 47/1.2, 34, 34.13, 38–40, 47/17–18; 71/118; 211/75

[56] References Cited
UNITED STATES PATENTS

| | | | |
|---|---|---|---|
| 619,752 | 2/1899 | Hudson | 248/208 |
| 762,014 | 6/1904 | Wittbold | 47/18 |
| 1,815,195 | 7/1931 | Favata | 47/38 X |
| 2,639,550 | 5/1953 | McKee | 47/17 |
| 3,016,801 | 1/1962 | Michel | 47/17 X |
| 3,078,780 | 2/1963 | Bottlander | 47/17 X |
| 3,099,355 | 7/1963 | Kane | 47/39 X |
| 3,446,272 | 5/1969 | Gaines | 47/17 X |
| 3,544,305 | 12/1970 | Olin | 71/118 |
| 3,667,159 | 6/1972 | Todd | 47/34.13 |

Primary Examiner—Robert E. Bagwill
Attorney, Agent, or Firm—Johnston, Keil, Thompson & Shurtleff

[57] ABSTRACT

Apparatus and process for the cultivation of high-quality plants in greenhouses whose side walls can be slid open vertically and whose atmosphere can be moistened at the openings thus formed with cultivation of the plants in said greenhouse in pots supported in respective recesses in trays, which in turn are supported on parallel, spaced, horizontal arms of racks supporting said trays above the floor of the greenhouse, the air circulating through the greenhouse passing through said racks, and the side wall of each recess having an opening to allow overflow of water accumulated in each recess.

10 Claims, 5 Drawing Figures

3,869,826

CULTIVATION OF PLANTS IN GREENHOUSES

RELATED APPLICATION

This application is a continuation of my copending application Ser. No. 178,124, filed Sept. 7, 1971 now abandoned.

Conventional plant cultivation processes in conventionally built greenhouses do not take into account the conditions encountered in actual practice. These greenhouses, inside which artificially determined temperature, moisture and light conditions are maintained, and which are not exposed to the natural external climate, have, particularly for biological experiments, the disadvantage that the plants are not provided with sufficient amounts of light, air and moisture. Furthermore, high summer temperatures have to be lowered by elaborate shading techniques.

In the winter months artificial light is used to lengthen the day. Lamps are suspended in the greenhouses to this end and this has a most disadvantageous consequence as directly under the lamps the light is very intense and the temperature extremely high, while their effect is markedly reduced just outside the said region.

All these factors contribute toward the plants being labile and developing non-uniformly. It has therefore previously not been possible to cultivate physiologically and morphologically valuable plants all the year round. Particularly when examining these plants for plant protection purposes it has not been possible to ensure clear and easily reproducible physiological results.

We have now found that these disadvantages are avoided by cultivating the plants in a greenhouse whose side walls can be slid open vertically to ventilate the interior and whose atmosphere may be moistened with water at the air entry apertures thus formed.

The apparatus and process according to the invention are illustrated by way of example by the accompanying drawings wherein.

By greenhouse is meant any building having a light-pervious roof and stable side walls 1 which can be slid open vertically, and which is used for cultivating plants, irrespective of the size of the building and its area.

The vertical sliding open of the side walls is effected by pushing vertically open, either partially or completely, more than one side wall, i.e., raising or lowering it - the side wall is preferably raised.

Figure 1:
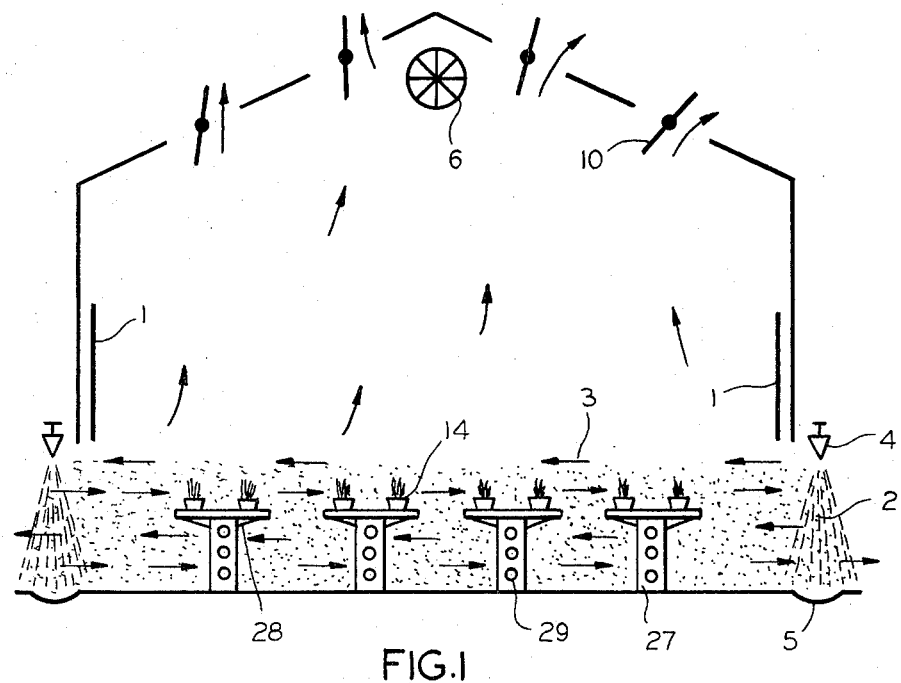
FIG. 1 represents a section through a greenhouse.

Apertures or passages 2 in the lower portions of the walls and extend to groundlevel (FIG. 1) are thus formed through which groundlevel air can pass into the greenhouse continuously and uniformly and without being impeded by any glass parts as is the case in conventional greenhouses.

If at least two walls (either adjacent or directly or diagonally opposite) are slid open, a draught is possible which corresponds to a considerable extent to wind movement in the open. The pots used for plant cultivation are thus continuously in this airstream 3 and are therefore exposed to as natural wind conditions as possible. The side walls may be slid open manually or semi- or fully automatically, i.e. the opening and closing of the ventilation may be effected by a motor with rack-and-pinion drive or with the aid of pneumatic cylinders. It is of course possible to include additional roof ventilation in this ventilation system.

Ventilation and temperature may be controlled fully automatically with the assistance of suitable instruments such as an anemoscope, anemometer and thermostat. It is thus possible to maintain a rhythm corresponding substantially to natural day and night conditions.

The ventilation of the greenhouse may be additionally linked with conventional ventilation methods, for example through openings 10 or ventilators 6 in the roof or gables of the greenhouse.

Advantageously the side walls are slid open so far that at the height at which the plants are located in the greenhouse air movement or air circulation results. The plants are therefore in contact with moving air, the result being that the action of the wind on plants in the open is simulated in the greenhouse. Conditions are thus created in the greenhouse substantially corresponding to those in nature.

In such a greenhouse, ventilation conditions are achieved simillar to those in a vegetation hall or in the open air, while the character of a greenhouse is maintained as the side walls can be firmly closed thus rendering the greenhouse completely winter-proof.

In accordance with the invention, the air flowing into the greenhouse through the apertures 2 is moistened with water at these apertures.

The water may be distributed for instance by atomizing nozzles 4. A veil of fine water droplets is produced in the airstream, the air thus becoming moistened. It is also possible to install nets or grilles in front of the side walls which close the apertures and down which water is trickled. The air is moistened on passing through these nets. An additional advantage of these nets is that they prevent animals larger than the mesh of the net, e.g., birds and mice, from entering the greenhouse. The mesh of the net should be such that undesired resistance to the air passing through it is avoided; that the water is sufficiently uniformly distributed; and that unwanted animals are prevented from entering.

The atmosphere of the greenhouse may be additionally moistened in conventional manner, for example by irrigation pipes above the plants or water jets on ventilators.

As light plays a decisive role in the growth of plants, they have to be artificially illuminated if natural light is lacking. It is known to use lamps for this artificial illumination which are located inside the greenhouse. However, the disadvantage of such a method is that the light is not uniformly distributed and the temperature in the greenhouse is unfavorably influenced by the heat developed by the lamps; the latter effect results in very rank growth of the plants which makes them incompatible with plants of high physiological quality. Such plants, when used for instance as test plants in plant protection experiments, may well give irregular results.

If there is a lack of natural light, particularly in winter or at dusk, it is therefore advantageous to illuminate the greenhouse and the plants therein with an illumination unit located outside the greenhouse. The effect of this is that light is uniformly distributed in the greenhouse; the light is able to be adjusted in individual areas of the greenhouse depending on the type of plant growing there, and the temperature inside the greenhouse remains unaffected. By employing a plurality of lamps situated at various points the formation of undesired shade is avoided. Furthermore, the interior of the greenhouse is not encumbered by lamps, so that free entry of daylight is not prevented.

If temperatures are too high in the summer months, the burning effect of sunlight can be reduced by allowing water to trickle over the roof; a few degrees' reduction in temperature may also be achieved by this measure.

The water from the roof irrigation system and that from the jets at the apertures in the side walls may be collected in an external channel 5 and passed, for instance via a filter unit, into a reservoir from where it can be recycled by means of a pump to the jets.

For cultivating large amounts of high-quality plants, it is advantageous to use a semi- or fully automatic machine for picking up, comminuting, sieving, fertilizing and mixing the soil required therefor and, again either semi- or fully automatically, to fill the soil prepared in this manner uniformly into pots, to sow it with one type of seed or a mixture of seeds, to cover with soil and press it down; these operations should be able to be carried out in a small space with a suitable seeding machine. Not only is labor thus saved, but a uniformity of preconditions for the cultivation of plants is achieved which considerably facilitates the cultivation of uniform plants in large amounts.

Figure 2:
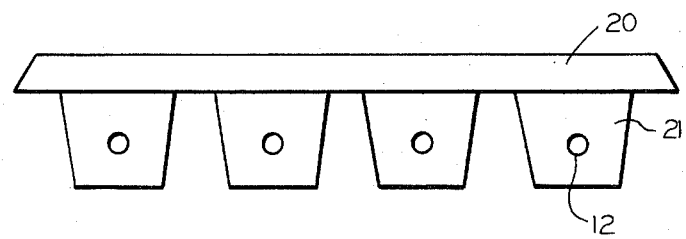
FIG. 2 is a side view and FIG. 3 is a plan view of a tray for holding pots.
Figure 3:
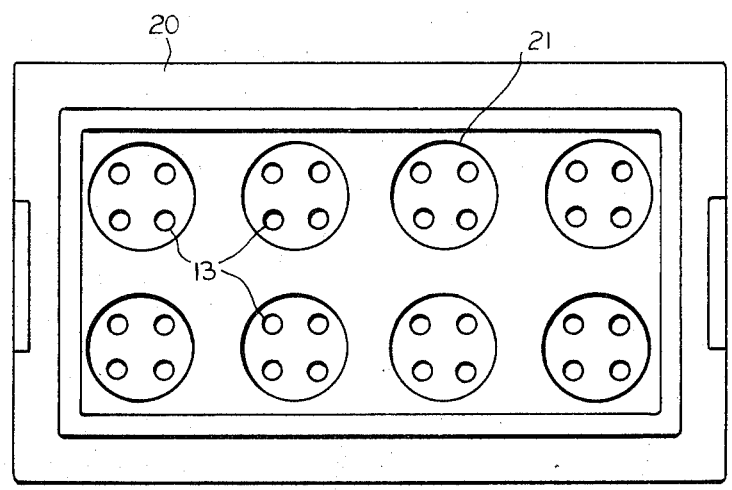
Figure 4:
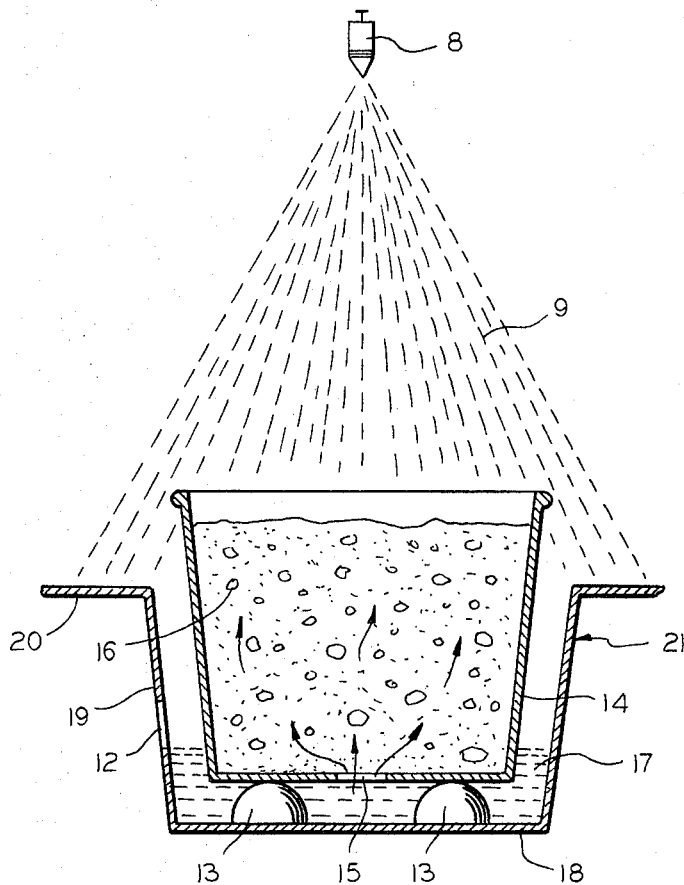
FIG. 4 is a part section through a filled tray and pot during irrigation.
Figure 5:
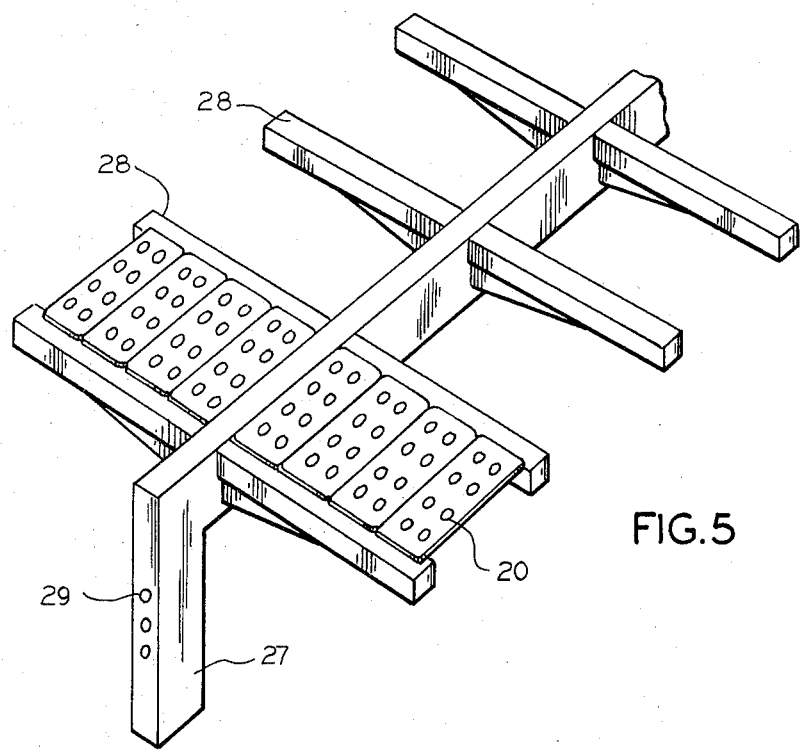
FIG. 5 is a view in perspective of racks with trays.

After the pots have been filled with earth, and seeds or plants have been placed therein, they are advantageously put in trays 20 (FIGS. 2 and 3) with a recess 21 for each pot; a hole is located in the side of each recess as water overflow.

It is of course also possible to prepare the pots manually as well as semi- or fully automatically. The pots are then placed either manually or automatically by the seeding machine in the trays; both trays and pots may be made of any suitable material. The only essential feature is that the pots and trays should be made of a material of sufficient mechanical strength and which is adequately resistant to the action of moisture. Both pots and trays may be reused after cultivation of the plants; it is advantageous to reuse only the trays. If the pots or trays are reused, it is advantageous to pass them either manually or with the aid of automatic conveying means through a washing unit (e.g., an ultrasonic cleaning unit) to clean them quickly and carefully. A suitable material for pots and trays is a plastic which is not susceptible to moisture, e.g., polyethylene, polyamide or polystyrene copolymers. If the pots are not for reuse, they can be made of cardboard treated with paraffin, of peat or similar material which after use is deposited with its soil in the open and rots. Soil stored in this manner, over a period of several years if possible, may then be reused either directly or after steaming. Not only may round pots 14, mentioned here by way of example, be used, but also vessels of other shapes, e.g. of polygonal, square or oval cross-section. The recesses in the trays must then conform with the shape of the pot. For each pot 14 there is an upwardly opening recess 21 in the tray 20, the diameter of the recess being somewhat larger than that of the pot 14. When the pots are irrigated in the greenhouse by water spray 9, water can collect in the recesses in the trays so that each pot is surrounded by a water supply 17 which has access to the soil 16 through a hole 15 in the bottom of the pot.

Advantageously there are projections 13 on the bottom wall 18 of the recesses 21 which on the one hand prevent the pots from resting completely on the bottom of the recess, and on the other permit the irrigation water 17 to be taken up with the fertilizer placed in the bottom of the recess. This water reservoir is limited by the height of holes 12 in the side wall 19 of the recess through which excess water overflows. When the pots are irrigated in the greenhouse by means of jets 8 and the directional water flow from these jets is not uniform, the resulting differences from pot to pot are cancelled out by the water reservoir and overflow in each recess of the trays. The pots are thus uniformly watered independent of the water supply from the irrigation jets. A further advantage of this method is that the intervals between irrigation of the pots can be extended as each pot has its own water reservoir.

In this manner the change in the open from rain to dryness can be substantially simulated in the greenhouse.

Of additional advantage is the fact that the fertilizer appropriate for each plant may be placed in each recess 21 of the trays before the pots are put in. Subsequent fertilizer additions are then unnecessary, as fertilizer, e.g., slow-release nitrogeneous fertilizer or plastic-coated fertilizer as a nutrient solution, is supplied to the plants together with the water over a fairly long period of time through the hole in the bottom hole 15 of each pot.

In the greenhouse the trays are advantageously transported with a forklift truck as it is readily adaptable to prevailing conditions. The forklift truck is constructed in such a way as to permit several trays with their pots to be loaded from the seeding machine and deposited on tables such as are described below. The forklift truck may also be employed for dumping used pots and for other transport operations.

The trays with their pots may be placed in conventional manner on tables in the greenhouse. Advantageously the trays are placed on racks 27. These racks have parallel horizontal arms 28 on which the trays 20 rest. The trays are held practically unsupported in mid-air, and ventilation underneath the trays is not impeded. Cleaning of the greenhouse floor is facilitated and the maneuverability of the forklift truck when transporting the trays is not restricted. The excess water overflowing after irrigation of the pots can be easily channelled out of the greenhouse. It is also possible to install a heating system 29 under the racks 27.

The process according to the invention can be controlled fully automatically; growth conditions in the greenhouse with regard to light, air, moisture and transport can be controlled much more simply and favorably.

The following examples show that the plants cultivated in accordance with the invention correspond to plants grown in the open with regard not only to their height but also to their resistance to a herbicide.

EXAMPLE 1

The plants *Triticum aestivum*, *Zea mays*, *Avena fatua*, *Beta vulgaris* and *Gossypium hirsutum* were simultaneously cultivated I in the open;
II in accordance with the invention;
III in a conventional greenhouse.

After 14 days, plants I and II both in habit and growth height were almost the same, whereas plants III had grown considerably higher and revealed an unnatural habit.

The height of the plants is given in the following table in cm (average values of 50 plants in each case):

TABLE

| Plants | I | II | III |
|---|---|---|---|
| Triticum aestivum | 9.2 | 9.1 | 11.3 |
| Zea mays | 5.7 | 5.8 | 8.6 |
| Avena fatua | 7.0 | 6.9 | 10.4 |
| Beta vulgaris | 2.3 | 2.5 | 5.7 |
| Gossypium hirsutum | 8.0 | 8.3 | 12.1 |

EXAMPLE 2

The plants Zea mays, Alopecurus myosuroides, Apera spica venti, Stellaria media, Chenopodium album, Amaranthus retroflexus and Cperus rotoundus were simultaneously cultivated I in the open;
II in accordance with the invention;
III in a conventional greenhouse.

After 10 days the plants were treated with a uniform dose of a known herbicide. After 3 weeks it was ascertained that the sensitivity of plants III was far greater than that of plants I and II.

The results of the damage to the plants are given in the following table (average values of 50 plants in each case):

TABLE

| Plants | I | II | III |
|---|---|---|---|
| Zea mays | 0 | 0 | 20 |
| Alopecurus myosuroides | 70 | 72 | 100 |
| Apera spica venti | 75 | 80 | 100 |
| Stellaria media | 70 | 70 | 95 |
| Chenopodium album | 74 | 77 | 100 |
| Amaranthus retroflexus | 50 | 53 | 85 |
| Cyperus rotundus | 40 | 45 | 80 |

0 = no damage
100 = complete destruction

The invention is hereby claimed as follows:

1. A process for cultivating physiologically and morphologically valuable plants in greenhouses which comprises cultivating said plants in a greenhouse having openings extending to groundlevel in the lower portions of at least two side walls of said greenhouse to maintain circulation of air through the greenhouse by natural movement of groundlevel atmospheric air into openings in one wall and out of openings in another wall, said plants being supported in said greenhouse at a height whereby at least the uppermost portion of the atmospheric air flow passes through the foliage of said plants, thereby providing in the greenhouse movement of air which is closely similar to the groundlevel atmospheric air in direction, strength and natural rhythm, whereby the plants cultivated in said greenhouse are closely similar in habit and growth to the same types of plants cultivated and grown in the open atmosphere and applying a herbicidal composition to said plants to test the effectiveness thereof, and making statistical evaluations of the herbicidal activity upon said plants by said composition to obtain toxicity results approximating the herbicidal activity of the same composition when similarly applied to the same plants growing in the open atmosphere.

2. A process for cultivating physiologically and morphologically valuable plants in greenhouses which comprises cultivating said plants in a greenhouse having openings in the lower portions of at least two side walls of said greenhouse to maintain circulation of air through the greenhouse by natural movement of atmospheric air into openings in one wall and out of openings in another wall, thereby providing in the greenhouse movement of air which is closely similar to the atmospheric air in direction, strength and natural rhythm, whereby the plants cultivated in said greenhouse are closely similar in habit and growth to the same types of plants cultivated and grown in the open atmosphere, and in pots supported in respective recesses in trays, which in turn are supported on parallel, spaced, horizontal arms of racks supporting said trays above the floor of the greenhouse, the air circulating through the greenhouse passing through said racks.

3. A process as claimed in claim 2, and providing in the side wall of each of said recesses in said tray an overflow opening to allow a reservoir of water to accumulate in each recess up to the height of its overflow opening.

4. A plant cultivating device useful in greenhouse cultivation of plants comprising a rack having a plurality of parallel, spaced, horizontal arms, a plurality of trays resting on and extending between contiguous arms, and pot-forming members with soil therein and plants growing in said soil supported by said trays, said trays each having a plurality of upwardly opening recesses therein with the pot-forming members seated in respective recesses, said recesses comprising a side wall and a bottom wall, and each recess having in its side wall a hole through which excess water accumulated in the respective recess can overflow.

5. A plant cultivating device as claimed in claim 4, and projections on the bottom wall of said recesses supporting the respective pot-forming members above the bottom wall.

6. A greenhouse for cultivating physiologically and morphologically valuable plants, said greenhouse having openings in the lower portions of at least two side walls of said greenhouse to maintain circulation of air through the greenhouse by natural movement of atmospheric air into openings in one wall and out of openings in another wall, thereby providing in the greenhouse movement of air which is closely similar to the atmospheric air in direction, strength and natural rhythm, and said plants being planted in pot-forming members with soil therein, and said pot-forming members being supported by a plurality of trays, and said trays in turn being supported by racks in said greenhouse, each rack having a plurality of parallel, spaced, horizontal arms with said trays resting on and extending between contiguous arms, whereby the air circulating through said greenhouse may circulate through said racks as well above said racks.

7. A greenhouse as claimed in claim 6, said trays each having a plurality of upwardly opening recesses therein with the pot-forming members seated in respective recesses.

8. A greenhouse as claimed in claim 7, said recesses comprising a side wall and a bottom wall, and each recess having in its side wall a hole through which excess water accumulated in the respective recess can overflow.

9. A greehouse as claimed in claim 8, and projections on the bottom wall of said recesses supporting the respective pot-forming members above the bottom wall.

10. A greenhouse as claimed in claim 6, said openings extending to groundlevel.

* * * * *